(12) United States Patent  (10) Patent No.: US 6,792,562 B1
Korhonen  (45) Date of Patent: Sep. 14, 2004

(54) FORMAT FOR EXTENSIBLE ERROR AND EVENT CODES

(75) Inventor: Aki Korhonen, Davis, CA (US)

(73) Assignee: PC-Doctor, Inc., Reno, NV (US)

( * ) Notice: Subject to any disclaimer, the term of this patent is extended or adjusted under 35 U.S.C. 154(b) by 422 days.

(21) Appl. No.: 09/800,756

(22) Filed: Mar. 6, 2001

Related U.S. Application Data

(60) Provisional application No. 60/187,132, filed on Mar. 6, 2000.

(51) Int. Cl.[7] .............................................. G06F 11/00
(52) U.S. Cl. .......................................... 714/39; 710/15
(58) Field of Search .............................. 714/39, 45, 46, 714/48, 57, 47, 52; 710/15, 17, 18

(56) References Cited

U.S. PATENT DOCUMENTS

| | | | | |
|---|---|---|---|---|
| 4,477,901 A | * | 10/1984 | Braband et al. ............... 714/46 |
| 5,446,878 A | * | 8/1995 | Royal ............................. 714/1 |
| 5,611,044 A | * | 3/1997 | Lundeby ....................... 714/38 |
| 5,661,668 A | * | 8/1997 | Yemini et al. ............... 702/186 |
| 5,682,328 A | * | 10/1997 | Roeber et al. .............. 702/187 |
| 5,724,564 A | * | 3/1998 | Conder et al. .............. 712/234 |
| 5,872,909 A | * | 2/1999 | Wilner et al. ................. 714/38 |
| 6,041,378 A | * | 3/2000 | Warren ......................... 710/307 |
| 6,108,700 A | * | 8/2000 | Maccabee et al. .......... 709/224 |
| 6,505,305 B1 | * | 1/2003 | Olarig ............................. 714/5 |

* cited by examiner

Primary Examiner—Nadeem Iqbal
(74) Attorney, Agent, or Firm—Townsend and Townsend and Crew LLP

(57) ABSTRACT

The present invention generally relates to event codes. More specifically, the present invention relates to an improved and extensible event code. An event code designed to identify an event is provided. In an exemplary embodiment, the event code of the present invention includes a set of predefined values and an optional set of implementation-driven values. The set of predefined values inform a user what kind of event has occurred and identify the various components which are related to this event. The set of predefined values further inform the user which of the various identified components are likely to have caused the event. Optionally, the set of implementation-driven values provides additional reference information which better enables the user to analyze the event. Additional self-help information is also available which may assist the user to address the event. Finally, the set of implementation-driven values optionally include a self-fix connection which the user can select to activate certain self-fix process(es) to automatically address the event.

21 Claims, 1 Drawing Sheet

FORMAT FOR EXTENSIBLE ERROR AND EVENT CODES

CROSS-REFERENCES TO RELATED APPLICATION(S)

This application claims the benefit of priority under 35 U.S.C. §119 from U.S. Provisional Patent Application No. 60/187,132 filed Mar. 6, 2000 entitled FORMAT FOR EXTENSIBLE ERROR AND EVENT CODES which is hereby incorporated by reference, as if set forth in full in this document, for all purposes.

BACKGROUND OF THE INVENTION

Typical error and event codes are a set of pre-defined values that are used to identify specific events and/or errors in a system. They are used to define abnormal states and their purpose is to provide an easy method to allow the presence of such a state to be communicated to an operator. Examples of typical error and event codes include codes, messages, and strings. Codes are usually represented by numbers while messages and strings are represented by text and possibly numbers.

As electronic devices (and systems) become more and more complicated, the possibility of events, such as errors, warnings, and other conditions, occurring in connection with such devices also correspondingly becomes greater and greater. These events are generally related to, for example, the operation of the device, the software that powers the device, and the user operation of the device.

Moreover, as the complexity of a device increases, the number of possible events and/or errors which can occur also increase accordingly. With the proliferation of the number and occurrence of possible events and/or errors, a comprehensive system keeping track of all possible events and errors becomes very difficult to develop. Nevertheless, error and event codes have been developed in an attempt to facilitate the identification of events and/or errors. However, codes which have been developed to date have many shortcomings.

Error and event codes developed to date generally fail to follow a standardized format. Because test programs are most likely written by many people independent of each other, the same event can be characterized differently. This is because the format of the error and event codes is usually left to the discretion of the designer and/or programmer. As a result, two different designers may use two different formats when they are designing a code for the same event.

To overcome the non-standardized format problem, an approach which specifies a pre-defined set of error and event codes can be used. This approach works well when the codes that are pre-defined reflect all possible errors or events. However, this approach does not work well in an environment where there is constant innovation that renders error and event code definitions obsolete within a relatively short period of time. Additional difficulties which renders this approach less effective include the problem of disseminating information about the error and event codes to multiple designers, and the problem of setting up a comprehensive set of error and event codes for all events.

Also, even if a set of error and event codes could be developed to encompass all known events, programmers working on different portions of a test program might categorize the same error differently and thus use different codes for the same error. Additionally, new errors could be found that are not in the set. New error and event codes could be developed but the new codes might not be disseminated fast enough and might cause problems for development that has already been coded. Thus, a rigid predefined set of error and event codes would not be fully compatible with the development process.

Furthermore, error and event codes developed to date generally do not provide sufficient information to allow the specific location of the event to be identified. These codes merely inform the outside world that an error and/or event has occurred but do not otherwise supply further information to allow a troubleshooter to easily pinpoint the location of the problem. Most likely, due to the complexity of most devices which exist today, a user would not know how to troubleshoot an error by merely knowing that an error has occurred. Thus, a code merely informing a user that an error has occurred would not be helpful.

Finally, these codes also do not provide any directions as to how to remedy an error or otherwise take steps to satisfy an event. The solution to an error is oftentimes relatively more valuable than having the knowledge that an error has occurred.

SUMMARY OF THE INVENTION

The present invention generally relates to event codes. More specifically, the present invention relates to an improved and extensible event code. An event code designed to identify an event is provided.

In an exemplary embodiment, the event code of the present invention includes a set of predefined values and an optional set of implementation-driven values. The set of predefined values inform a user what kind of event has occurred and identify the various components which are related to this event. The set of predefined values further inform the user which of the various identified components are likely to have caused the event.

More specifically, the set of predefined values is collectively represented by a number of fields including: a severity ID, an originator ID, an event class, an event cause ID, an instance ID and an event location ID. The severity ID is used to provide information concerning the severity of the event. The originator ID is used to indicate where the event originated. The event class identifies the nature of the event. The event cause ID identifies what hardware, software, or other component is related to the event. Instance ID provides information on the specific instance of hardware, software, or other component that is related to the event. Event location ID provides information on what is believed to be the cause of the event.

Optionally, the set of implementation-driven values provides additional reference information which better enables the user to analyze the event. Additional self-help information is also available which may assist the user to address the event. Finally, the set of implementation-driven values optionally include a self-fix connection which the user can select to activate certain self-fix process(es) to automatically address the event.

More specifically, the set of implementation-driven values is collectively represented by a number of fields including: a code reference ID, reference data, a self-help connection, a self-fix connection and self-fix data. The code reference ID contains reference information that shows the specific location in a module that found or caused the event. The reference data includes reference information that can be used to troubleshoot or debug the event. The self-help connection identifies information about the type of event that is detected. The self-fix connection includes a connection to one or more self-fix process(es) that can be used to automatically address the event. The self-fix data includes data to be used in connection with the self-fix process(es) initiated by selection of the self-fix connection.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
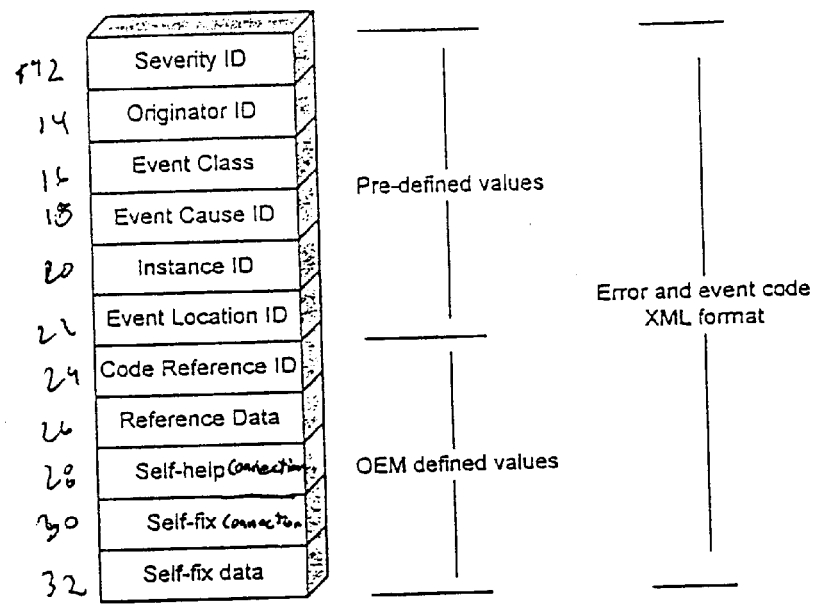
FIG. 1 is a simplified schematic diagram illustrating an exemplary embodiment of the present invention.

The present invention will now be described. A test process is run that detects an event and generates a code representing that event. An event includes, for example, an error, a warning, a condition, or some other notable information. By examining the generated code, a user or another computer program is then able to identify the event and take appropriate measures. In an exemplary embodiment according to the present invention, the format of the code generally includes two types of values, namely, a set of predefined values and a set of implementation-driven (or OEM-defined) values.

The set of predefined values provides a hierarchical structure to allow events to be more precisely defined and identified. For example, the set of predefined values allows various event categories to be initially defined at a high level. If appropriate, these event categories may then be further broken down and represented as subcategories at a more refined level. As a result, events can be categorized in both broad and narrow terms thereby allowing a user examining the code to more easily identify the event.

The set of implementation-driven (or OEM-defined) values provides the flexibility to allow additional codes to be defined on an ad hoc basis. Hence, if an event does not fall exactly into previously defined event category or subcategory, a process is available to allow a programmer of a module to have the ability to define new codes.

Moreover, the set of implementation-driven (or OEM-defined) values also provides additional information which allows a user to address the event accordingly. Additionally, a self-fix process is provided that automatically fixes the issue related to the event.

More specifically, FIG. 1 is a simplified schematic diagram illustrating an exemplary embodiment of the format of an extensible event code in accordance with the present invention. According to the exemplary embodiment, the format of the event code includes a number of fields, namely, severity ID 12, originator ID 14, event class 16, event cause ID 18, instance ID 20, event location ID 22, code reference ID 24, reference data 26, self-help connection 28, self-fix connection 30, and self-fix data 32. Fields 12–22 represent a set of predefined values and fields 24–32 represent a set of implementation-driven (or original equipment manufacturer, OEM, defined) values. These fields, as will be described in more detail below, collectively constitute an event code which allows a user to more efficiently identify and address the event.

Severity identifier or ID 12 is used to provide information concerning the severity of the event. Information provided by the severity ID 12 belongs to one of several types, namely, progress notification, informative message, warning message, error message, and critical error message.

Progress notification is used to identify how much of a process had been completed when the event occurred. For example, a memory test might periodically generate an event that shows progress of the test, and the progress notification could then include information on how much of the memory test has been completed.

Informative message is used to convey information related to the event that is likely to be significant or of interests to the user. For example, if the event which occurred is a hard drive operational test, the message could disclose how many drivers or hard drives were tested.

A warning message is used to convey information designed to warn the user of possible impending errors if the event which occurred remains unchecked. Examples of warning messages include when a computer is running out of hard drive space, and the battery is low.

An error message is used to inform the user when an error has occurred in the device or system. For example, a bad sector on a hard drive may result in an error message.

A critical error message is used to indicate imminent danger for the device or system, such as instances where the device or system will become inoperational if certain conditions persist. For example, an error that is detrimental to the system's performance, such as a bad memory failure, may trigger a critical error message.

Originator identifier or ID 14 is used to indicate where the event originated. In a specific embodiment, the originator ID 14 further includes an ID component and a type component. The ID component identifies the name of the module which originated or created the event. For example, possible ID components can include a hard drive test module or a memory test module. The type component identifies the module class or the type of module which originated the event. Examples of possible module classes or types of modules include: runtime module, on-demand module, information module, firmware application, operating system, and system application.

The runtime module class represents a module that runs while the device or system is active. For example, a runtime module may be a test module that runs in the background while the computer is running.

The on-demand module class represents a module that is initiated by an event, such as a user double-clicking on a link for the test or a disk scan test that is run when a user turns on a computer.

The information module class represents a module that retrieves system and operational information from a system. For example, configuration data or any other information about a system is retrieved by the information module.

The firmware application class includes modules that initiate operation of the device or the system. For example, a basic input/output system (BIOS) is a firmware application.

The operating system (OS) class includes modules related to the OS. For example, a process built into the OS can generate an event.

The system application class includes any other applications or programs which are capable of generating events. For example, a word processing or Internet browser can generate events of this class.

Event class 16 identifies the nature of the event. The nature of an event can be either hardware or software. An example of a hardware event is when a floppy drive is tested without a floppy present in the drive. In this case, an error or warning is outputted with an event class of hardware. In another instance, an error related to a word processing program fall into an event class of software.

The event cause identifier or ID 18 identifies what hardware, software, or other component is related to the event. The event cause ID 18 provides further information about an event in addition to the information already provided by the event class 16. For example, if the event class 16 is identified as hardware, the event cause ID 18 additionally identifies the specific hardware which is related to the event, the type of hardware event, and other optional information that is related to the identified hardware event. Similarly, if the event class 16 is identified as software, the event cause ID 18 additionally identifies the specific software which is related to the event, the type of software event, and other optional information that is related to the identified software event.

In the hardware context, an example of an event cause ID provides information including the hardware or device that caused the event, the type of hardware problem which occurred within the device, and additional information related to the identified hardware problem. More specifically, for example, the event cause ID provides the following information including: the hard disk is related to the event, the problem is a bad disk sector and the bad disk sector is located at a specified address.

Similarly, in the software context, an example of an event cause ID provides information including the software module or program that caused the event, the type of software problem which occurred within the software module, and additional information related to the identified software problem. More specifically, for example, the event cause ID provides the following information including: the data processing program is the cause of the event, and the problem is an infinite loop within the program.

Instance identifier or ID 20 provides information on the specific instance of hardware, software, or other component that is related to the event. This information is provided so that multiple instances of the same type of components can be identified. For example, the instance ID 20 can be used to identify the second of three hard drives as causing the event.

Event location identifier or ID 22 provides information on what is believed to be the cause of the event. Preferably, the event location ID 22 includes two types of information, namely, a high level identification of the area which caused the event and a more detailed identification of elements within the area which caused the event. In essence, the event location ID 22 provides certain useful information so as to allow the cause of the event to be pinpointed. In contrast, the event cause ID 18 identifies the specific elements which are related to the event, while the event location ID 22 is provided so as to allow the cause of the event to be identified from those specific elements.

For example, if the event is identified as related to the hard disk and the problem is identified as the inability to read the hard disk, then the event location ID 22 may provide information which indicates that the problem is related to the hard disk and that, more specifically, the problem is attributed to the hard disk controller.

Furthermore, the event location ID 22 may contain multiple values when the event may be attributed to two or more causes. Continuing with the example given above, the hard disk cable and/or the hard drive itself may be pinpointed as causing the event. Alternatively, the event location ID 22 may contain information which excludes certain components as a cause of the event. For example, the event location ID 22 may indicate that the hard disk controller did not cause the event. The user would then have to determine whether the problem was within the hard disk cable or the hard drive.

The five remaining fields 24–32, code reference ID 24, reference data 26, self-help connection 28, self-fix connection 30 and self-fix data 32, collectively represent a set of implementation-driven (or OEM-defined) values. That is, these fields 24–32 are included as part of the event code on an optional or ad hoc basis by a module designer in order to facilitate testing and debugging of modules.

Code reference identifier or ID 24 contains reference information that shows the specific location in a module including, for example, a test module, a firmware application, a software application, an operating system component or any computer program, or portions thereof, which is capable of generating events, that found or caused the event. Preferably, information contained in the code reference ID 24 is supplied on an ad hoc basis by the designer of the module that caused the event. Using the code reference ID 24, a designer can then peruse the module code at the specific location to determine what code caused the event thereby allowing the designer to debug or troubleshoot the event. An example of a code reference ID 24 contains the name of the source file or module followed by a line number.

The reference data 26 includes reference information that can be used to troubleshoot or debug the event. The reference information is related to the event. Preferably, information contained in the reference data 26 is similarly supplied on an ad hoc basis by a module designer. The reference data 26 is used in cooperation with the code reference ID 24 to debug or troubleshoot the event. The code reference ID 24 allows the specific location within a module which caused the event to be identified. Having identified the specific location, the reference data 26 can then be used to further analyze why the event occurred. For example, in a failed memory test, the code reference ID 24 may provide information on the specific location within the module where the failure occurred. The reference data 26 may then contain information on the test pattern used to conduct the memory test and the output results generated in response to the test pattern. Using the reference data, including the test pattern and the output results, the module designer is then better equipped to evaluate why the memory test failed.

The self-help connection 28 identifies information about the type of event that is detected. The self-help connection 28 provides a user with self-help information to help the user address the event or take other appropriate actions. The self-help connection 28 can be implemented in a number of ways. For example, a user-readable string can be stored that can be displayed to the user in a window containing the information, an icon providing a connection to the information can be provided, or an HyperText Markup Language (HTML) link or hyperlink, or URL can be used.

The self-fix connection 30 includes a connection to one or more self-fix process(es) that can be used to automatically address the event. The self-fix connection 30 allows a user to initiate certain processes to automatically address the event. Similarly, the self-fix connection 30 is implemented as a link to the self-fix process(es). For example, a self-fix process can be a program that downloads a new printer driver via the Internet when the existing printer driver fails.

In this case, a user is provided with the self-fix connection 30 which is implemented in the form of a hyperlink or URL to a self-fix process. Upon activation of the hyperlink, the appropriate Internet web site is located and contacted to allow downloading of the correct and necessary new printer driver. Once the downloading is completed, the new printer driver can be installed automatically.

Self-fix data 32 includes data to be used in connection with the self-fix process(es) initiated by selection of the self-fix connection 30. Continuing with the above example, information on the version of the new printer driver is included in the self-fix data 32. This information is needed so that when the self-fix connection 30 is activated, the correct version of the new printer driver can be downloaded from the appropriate web site.

As described above, the set of implementation-driven (or OEM-defined) values collectively represented by the fields 24–32 thus allows a test module designer the flexibility to define events that are not found in the set of predefined values represented by fields 12–22.

In a preferred embodiment, the event code as described herein is implemented in Extensible Markup Language (XML) format. XML allows the event code to be portable across different platforms and does not constrain a developer to a certain computing language or operating system. Also, it should be understood that although it is contemplated that XML will be used, any computing language sharing similar properties as XML can be used to implement the event code as described herein. Thus, a platform independent, extensible, open event code format is produced.

The event codes as described herein are generally used in the following manner. A program, which can contain multiple modules, is run on a device. The program can be run in the background or run on-demand upon activation of a command. When the program detects an event, an event code associated with that event is displayed to a user. The event code informs the user what kind of event has occurred and identifies the various components of the device which are related to this event. The event code further informs the user which of the various identified components are likely to have caused the event.

Optionally, the event code provides additional reference information which better enables the user to analyze the event. Additional self-help information is also available which may assist the user to address the event. Finally, the event code optionally includes a self-fix connection which the user can select to activate certain self-fix process(es) to automatically address the event. It should be understood that a person of ordinary skill in the art will know of other ways to utilize the event code as described herein.

It should be understood that the event code described herein can be implemented in a number of ways. For example, the various fields in the event code can be represented on a numeric basis. A person of ordinary skills in the art will know of other ways and methods to implement the various fields of the event code in accordance with the present invention.

It is understood that the examples and embodiments described herein are for illustrative purposes only and that various modifications or changes in light thereof will be suggested to or become apparent to persons skilled in the art and are to be included within the spirit and purview of this application and scope of the appended claims. All publications, patents, and patent applications cited herein are hereby incorporated by reference for all purposes in their entirety.

What is claimed is:

1. An event code designed to identify an event which occurs during the course of testing and/or operation of a system, the event code comprising:
   a set of pre-defined values which indicate what kind of event has occurred, identify elements of the system which are related to the event, and indicate which of the identified elements of the system are likely to have caused the event; and
   a set of implementation-driven values which provide reference and self-help information to allow a user to analyze the event and include a self-fix connection which allows the user to activate one or more self-fix process(es) to automatically address the event.

2. The event code according to claim 1, wherein said set of implementation-driven values are created on an ad hoc basis by a designer of the event code.

3. An event code designed to identify an event which occurs during the course of testing and/or operation of a system, the event code comprising:
   a first plurality of identifiers which describe aspects of the event and provide information identifying possible cause of the event; and
   a second plurality of identifiers which provide information to allow a user to analyze and address the event, the information including a self-fix connection that allows the user to activate one or more self-fix processes to automatically address the event.

4. The event code of claim 3, wherein the first plurality of identifiers comprises a severity identifier, wherein said severity identifier describes the severity of the event.

5. The event code of claim 4, wherein the severity identifier contains one of a plurality of messages including a progress notification, a informative message, a warning message, an error message, and a critical error message.

6. The event code of claim 3, wherein the first plurality of identifiers comprises an originator identifier, wherein the originator identifier is used to identify where the event originated.

7. The event code of claim 6, wherein the originator identifier further comprises an ID component which identifies a module name, and a type component which identifies a module class.

8. The event code of claim 3, wherein the first plurality of identifiers comprises an event class, wherein the event class identifies the nature of the event.

9. The event code of claim 8, wherein the nature of the event identified by the event class is either hardware or software.

10. The event code of claim 3, wherein the first plurality of identifiers comprises an event cause identifier, wherein the event cause identifier identifies one or more elements of the system which are related to the event.

11. The event code of claim 3, wherein the first plurality of identifiers comprises an instance identifier, wherein the instance identifier identifies a specific instance of an element of the system which is related to the event, where multiple instances of the element exist.

12. The event code of claim 3, wherein the first plurality of identifiers comprises an event location identifier, wherein the event location identifier provides information on what is believed to have caused the event.

13. The event code of claim 12, wherein the event location identifier identifies one or more elements of the system which are believed to have caused the event.

14. The event code of claim 3, wherein the second plurality of identifiers comprises a code reference identifier, wherein the code reference identifier identifies a specific location in a software module that caused the event.

15. The event code of claim 14, wherein the second plurality of identifiers comprises reference data, wherein the reference data includes data which are used in cooperation with the code reference identifier to allow a user to analyze the cause of the event.

16. The event code of claim 3, wherein the second plurality of identifiers comprises a self-help connection, wherein the self-help connection provides self-help information which assist a user to address the event.

17. The event code of claim 3, wherein the second plurality of identifiers comprises self-fix data, wherein the self-fix data include data which are used in cooperation with the self-fix connection to address the event.

18. An event code designed to identify an event which occurs during the course of testing and/or operation of a system, the event code comprising:
   a first plurality of pre-defined identifiers which describe aspects of the event and provide information identifying possible cause of the event, said first plurality of pre-defined identifiers includes:
      a severity identifier which describes the severity of the event;
      an originator identifier which is used to identify where the event originated;
      an event class which identifies the nature of the event;
      an event cause identifier which identifies one or more elements of the system which are related to the event;
      an instance identifier which identifies a specific instance of an element of the system which is related to the event, where multiple instances of the element exist; and
      an event location identifier which provides information on what is believed to have caused the event; and
   a second plurality of implementation-driven identifiers which provide information to allow a user to analyze and address the event, the second plurality of implementation-driven identifiers includes:
      a code reference identifier which identifies a specific location in a test module that caused the event;
      reference data which includes data that are used in cooperation with the code reference identifier to allow a user to analyze the cause of the event;
      a self-help connection which provides self-help information which assists the user to address the event;
      a self-fix connection which allows the user to activate one or more self-fix processes to automatically address the event; and
      self-fix data which include data that are used in cooperation with the self-fix connection to address the event.

19. A method for providing an event code to identify an event which occurs during testing and/or operation of a system, the method comprising:
   detecting when the event occurs during testing and/or operation of the system; and
   in response to detecting the event, displaying the event code associated with the event, wherein the event code describes aspects of the event, identifies one or more elements of the system which are related to the event, and identifies one or more possible causes of the event, wherein the event code further provides information on how to address the event and provides a self-fix connection which allows the event to be addressed automatically.

20. The method according to claim 19, further comprising:
   activating the self-fix connection so as to have the event addressed automatically.

21. The method of claim 19, wherein displaying the event code further comprises:
   displaying a severity identifier, wherein the severity identifier describes the severity of the event;
   displaying an originator identifier, wherein the originator identifier is used to identify where the event originated;
   displaying an event class, wherein the event class identifies the nature of the event;
   displaying an event cause identifier, wherein the event cause identifier identifies one or more elements of the system which are related to the event;
   displaying an instance identifier, wherein the instance identifier identifies a specific instance of an element of the system which is related to the event, where multiple instances of the element exist; and
   displaying an event location identifier, wherein the event location identifier provides information on what is believed to have caused the event.

* * * * *